United States Patent [19]

Vester et al.

[11] 4,349,964
[45] Sep. 21, 1982

[54] VIEWING ANGLE MEASURING DEVICE FOR AUTOMOTIVE VEHICLES

[75] Inventors: Ewald Vester, Waiblingen; Rolf Grüssaber, Murr; Wolfgang Küpper, Plochingen; Horst Glatzhoefer, Stuttgart, all of Fed. Rep. of Germany

[73] Assignee: Daimler-Benz Aktiengesellschaft, Stuttgart, Fed. Rep. of Germany

[21] Appl. No.: 156,793

[22] Filed: Jun. 5, 1980

[30] Foreign Application Priority Data

Jun. 22, 1979 [DE] Fed. Rep. of Germany ....... 2925155

[51] Int. Cl.³ .............................................. G01B 11/00
[52] U.S. Cl. ........................................ 33/264; 33/227; 33/281
[58] Field of Search ................. 33/281, 264, 262, 227, 33/228, 263, 275 R, 286

[56] References Cited

U.S. PATENT DOCUMENTS

| 2,158,310 | 5/1939 | Smith et al. | 33/264 |
| 3,051,047 | 8/1962 | Fieux | 33/262 X |
| 3,469,919 | 9/1969 | Zellner | 33/281 |

Primary Examiner—William D. Martin, Jr.
Attorney, Agent, or Firm—Craig and Antonelli

[57] ABSTRACT

A viewing angle measuring device for automotive vehicles. The measuring device includes an elliptical template representing a so-called visual ellipse. The template is arranged in the vehicle in a prescribed position with respect to a driver's seat regarding a center position and an axial inclination. A measuring beam projector may be guided with its optical axis and/or with a measuring beam tangentially along a governing curve of the elliptical template. A goniometer, continuously indicating the viewing angle, is connected to the measuring beam projector to determine the beam direction with respect to a reference plane as a measure of the viewing angle.

13 Claims, 4 Drawing Figures

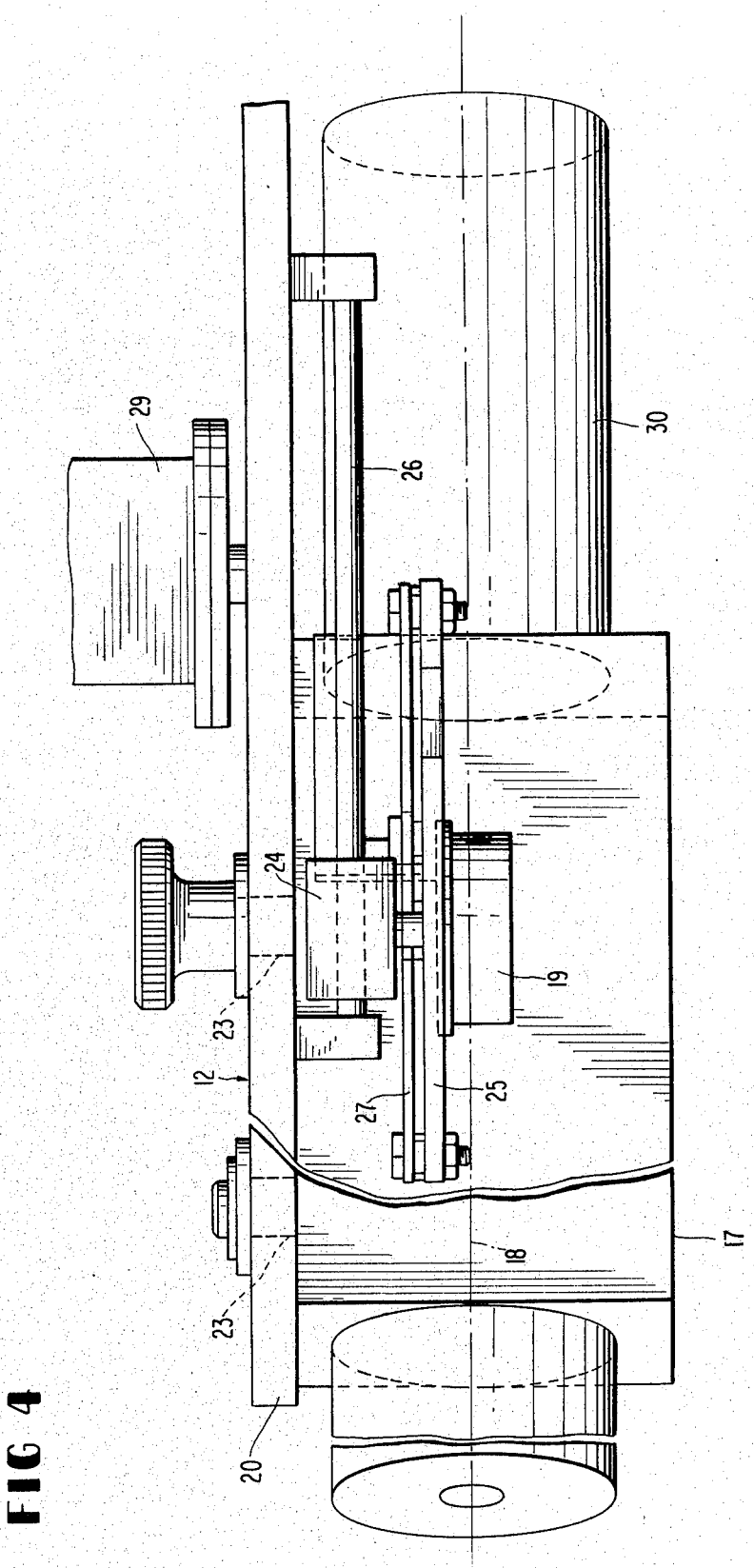

VIEWING ANGLE MEASURING DEVICE FOR AUTOMOTIVE VEHICLES

The present invention relates to a measuring apparatus and, more particularly, to a viewing angle measuring device for automotive vehicles whereby it is possible to determine reproducible measuring data for characterizing viewing conditions from a drivers seat of the vehicle, with the measuring data concerning the viewing conditions being representative or characteristic for a preponderant statistically representative cross section of drivers using the vehicle.

In the United States of America, a very large number of statistical series measurements were conducted on vehicles of various sizes with the measurements being evaluated by photogrammetry. During the course of the series measurements, it was observed that a very large number of individuals tested had to seat themselves behind the steering wheel of the motor vehicle and optimally adjust the driver's seat in correspondence with or to conform to the shape of their body. After the adjustment by the individuals, they were then instructed to look out of the vehicle in the driving direction, straight ahead and horizontally. With the driver in this attitude, the position of the eyes relative to the vehicle was photographically recorded.

Throughout the statistical series of measurement, the reference point was a coordinate system having a vertical axis which passed through a so-called hip point, that is, a point of articulation between the thigh and trunk in the most rearward seating position, and a horizontal axis extending parallel to a longitudinal direction of the vehicle and located 635 mm above the hip point.

Within such a reference or coordinate system, a so-called normal or Gaussian frequency distribution evolved with respect to the position of the eyes of the respective drivers. This multidimensional Gaussian distribution took the form of a bell-shaped curve or "profile" having an approximately elliptical cross section. By disposing an arbitrary section plane through the multidimensional Gaussian distribution, an area of the positional distribution of the eyes can be separated into a proportion corresponding to only about 5% of the persons and into a proportion corresponding to the remaining 95% of the persons, i.e., the so-called 95% line.

In this connection, the so-called 95% line may be considered, for example, to be a sight beam tangent on the rim of the window or on the rim of a wiped window area. In such a case, the eyes of 95% of the driving populace lies on that side of the limit sight line where the eyes can still see past the viewing obstacle; whereas, the eyes of only 5% lie outside of this imaginary limit line. If, for example, 95% lines of a great variety of inclinations are laid through the multidimensional Gaussian distribution, then an ellipse is obtained as an envelope curve for all of these lines, which ellipse is a so-called visual or eye ellipse. Such visual ellipses can be determined not only for the 95% proportion of the population but also for different proportions such as, for example, 90% proportions or 99% proportions of the population.

In SAE Publications J 941 et seq, the size, shape, and arrangement of the visual ellipses in the vehicle are described. In a side view, the visual ellipse has a gradient of 6.4% obliquely in a forward direction with respect to the horizontal X-axis of the aforementioned reference or coordinate system. The long half axis lies approximately in the driving direction of the vehicle and, with an adjustment distance of the driver's seat of about 160–170 mm, has a length of 198 mm. The minor half axis of the visual ellipse is, in side view, 86 mm and for the visual ellipse determinable and representable in plan view, 105 mm.

With a normally customary back inclination or so-called torso angle of 25°, a center of the visual ellipse is offset toward the front and toward the bottom with respect to a center of the reference or coordinate system. More particularly, with a seat adjustment distance of about 160–170 mm, a center of the ellipse is offset downwardly by 8.4 mm and forwardly by 22.9 mm with respect to a center of the reference or coordinate system. Tabular data regarding the shape and position of the ellipse in dependence upon a magnitude of the seat adjustment and seat back inclination as well as suggestions for fashioning drafting templates for appropriate visual ellipses are contained in the aforementioned SAE Publications which are incorporated herein by reference.

While drafting templates such as proposed in the aforementioned SAE Publications are useful, it is merely possible with the aid of such templates to determine the viewing angles on the drawing board but not in an actually constructed motor vehicle.

The aim underlying the present invention essentially resides in providing a measuring device which, based on the principle of visual or eye ellipses, makes it possible to verify the visual conditions on an actually designed or constructed motor vehicle.

In accordance with advantageous features of the present invention, an elliptical template representing the so-called visual ellipse is arranged in the vehicle in a prescribed relative position with respect to the driver's seat and with respect to a center position and a predetermined axial inclination. A measuring beam projector may be guided with its optical axis and/or with a measuring beam tangentially along a governing curve of the elliptical template. A goniometer, continuously indicating the viewing angle, is connected to the measuring beam projector to determine the beam direction with respect to a reference plane as a measure for the viewing angle.

In accordance with the present invention, the elliptical template may be mounted within the vehicle in a defined prescribed position by means of a suitable stand installed in the vehicle in place of the driver's seat or by means of a measuring instrument projecting laterally with one arm into the vehicle. What is involved herein can be the vertical side elevational visual ellipse extending in the longitudinal direction of the vehicle or the horizontally extending plan view visual ellipse to determine the horizontal sight conditions.

By means of the measuring beam projector guided along the elliptical template in accordance with the present invention, it is possible to determine directly whether an object lying outside of the vehicle is still within the visual range, for example, for 95% of the population utilizing the vehicle or whether the object is already covered up by a visual obstacle located at the vehicle such as, for example, the engine hood, rear view mirror, and/or a lateral post of the windshield.

Moreover, it is also possible to determine not only directly the visual conditions toward the outside of the vehicle but also the visual relationships with respect to the instruments and control lamps on the dashboard of the vehicle behind the steering wheel or through the spokes of the steering wheel. It is also possible to determine the vision as viewed through the rearview mirror or rearview mirrors toward the rear can be measured.

As can readily be appreciated, a measuring device such as proposed by the present invention is necessary not only in a development phase of a novel vehicle to determine if, for example, visual conditions of a prototype are inadequate so that possible vehicle alterations could be effected in time, but also the presently proposed viewing angle measuring device is also an aid for the demonstration of adequate visual conditions before the safety and approval authorities of vehicles developed and ready for series production.

In accordance with further advantageous features of the present invention, the elliptical template includes a guide groove worked into a guide plate and, corresponding to the visual ellipse, and of a reference groove worked into the guide plate tangentially or at an acute angle equidistantly to the guide groove. A sliding block, sliding pin or the like is fixedly connected to the measuring beam projector and located so as to be congruent with or laterally definitively offset with respect to the optical axis or the measuring beam of the projector 17 respectively engaging this groove in such a way that the measuring beam projector lies in all cases tangentially with the measuring beam to the center line of the guide groove.

Advantageously, the measuring beam projector in accordance with the present invention utilizes a laser apparatus as the beam source.

In accordance with still further features of the present invention, the goniometer contains two mutually pivotable members and is guided with one of its members on the guide plate in parallel to the guide plate and to itself to be movable, preferably, by means of a guide post, with the other member of the goniometer being guided at the measuring beam projector likewise in parallel to the guide plate at a predetermined spacing movable with respect to the measuring projector but always in a constant relative rotary position with respect to the latter preferably by way of, for example, a parallelogram type guide means.

To provide for a rotation sensitive angular measuring member, in accordance with the present invention, the goniometer is provided with a rotary potentiometer between the two mutually pivotable members.

Accordingly, it is an object of the present invention to provide a viewing angle measuring device for automotive vehicles which enables a determination and/or verification of viewing angles or visual conditions in the motor vehicle.

Another object of the present invention resides in providing a viewing angle measuring device for motor vehicles which enables an optimum positioning of vehicle controls, instrument, lamps, etc. in the vehicle.

Yet another object of the present invention resides in providing a viewing angle measuring device for automotive vehicles which enables an evaluation of viewing conditions of the vehicle in a simple and efficient manner.

These and other objects, features, and advantages of the present invention will become more apparent from the following description when taken in connection with the accompanying drawings which show, for the purposes of illustration only, one embodiment of a viewing angle measuring device in accordance with the present invention, and wherein:

FIG. 4 is a plan view of the measuring device of FIG. 3.

Figure 1:
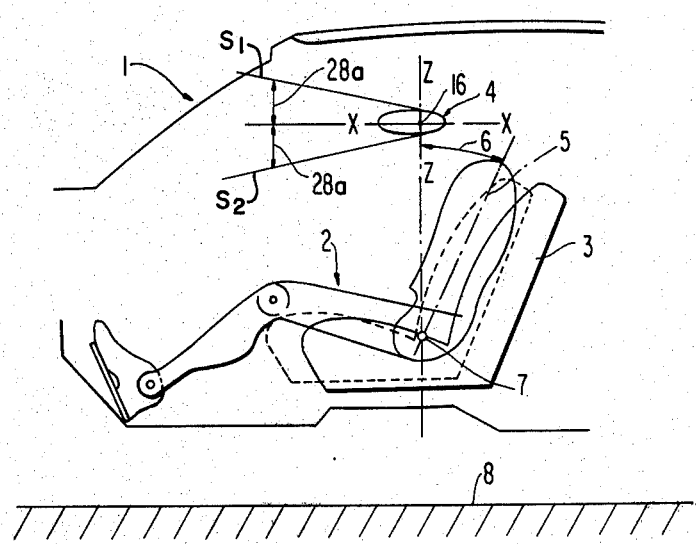
FIG. 1 is a schematic side elevational view depicting an approximate positioning of visual ellipses in a passenger motor vehicle.
Figure 2:
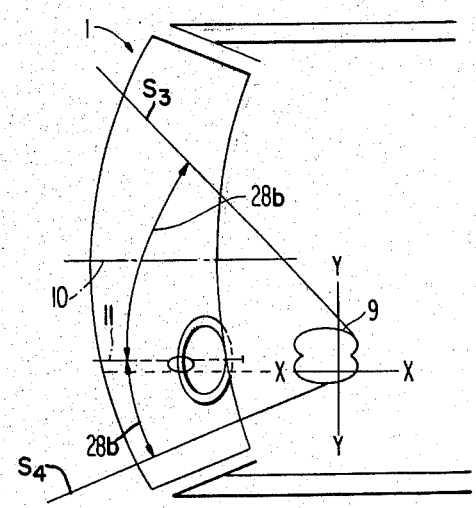
FIG. 2 is a schematic top plan view illustrating the approximate position and configuration of the visual ellipses of FIG. 1.

Referring now to the drawings wherein like reference numerals are used throughout the various views to designate like parts and, more particularly, to FIGS. 1 and 2, according to these Figures, a vehicle generally designated by the reference numeral 1, shown with its contour lines in a partially schematic view, includes a driver's or operator's seat 3 having seated therein a measuring dummy generally designated by the reference numeral 2 fashioned as a drafting template. The driver's seat 3 has an adjusting range in the longitudinal direction of the vehicle 1 to and from a rearmost position illustrated in solid line and a foremost position illustrated in phantom lines. A so-called torso line 5 is indicated on the trunk or torso of the measuring dummy 2 with the line 5 lying at least approximately parallel to the back of the seat 3. The line 5 extends through a hip point 7, with the hip point representing a point of articulation between the torso and thigh. Normally, a torso angle, that is, an angle between the torso line 5 and a vertical plane, is about 25°. The reference numeral 8 indicates the location of the road level.

The reference or coordinate system for the side elevation visual ellipse 4 is formed by a vertical Z-axis or Z-plane passing through the hip point 7 when the seat 3 is located in its rearmost position and through a horizontal X-axis or X-plane extending 635 mm above the hip point 7. While the position of the side elevation visual ellipse 4 is indicated only approximately in FIG. 1, it is noted that the visual ellipse 4 is inclined with its long half axis by 6.4° with respect to the X-axis in a downward and in a forward direction. Moreover, a center 13 (FIG. 3) of the visual ellipse is also displaced with respect to a center 16 of the reference or coordinate system in a forward and downward direction.

Figure 3:
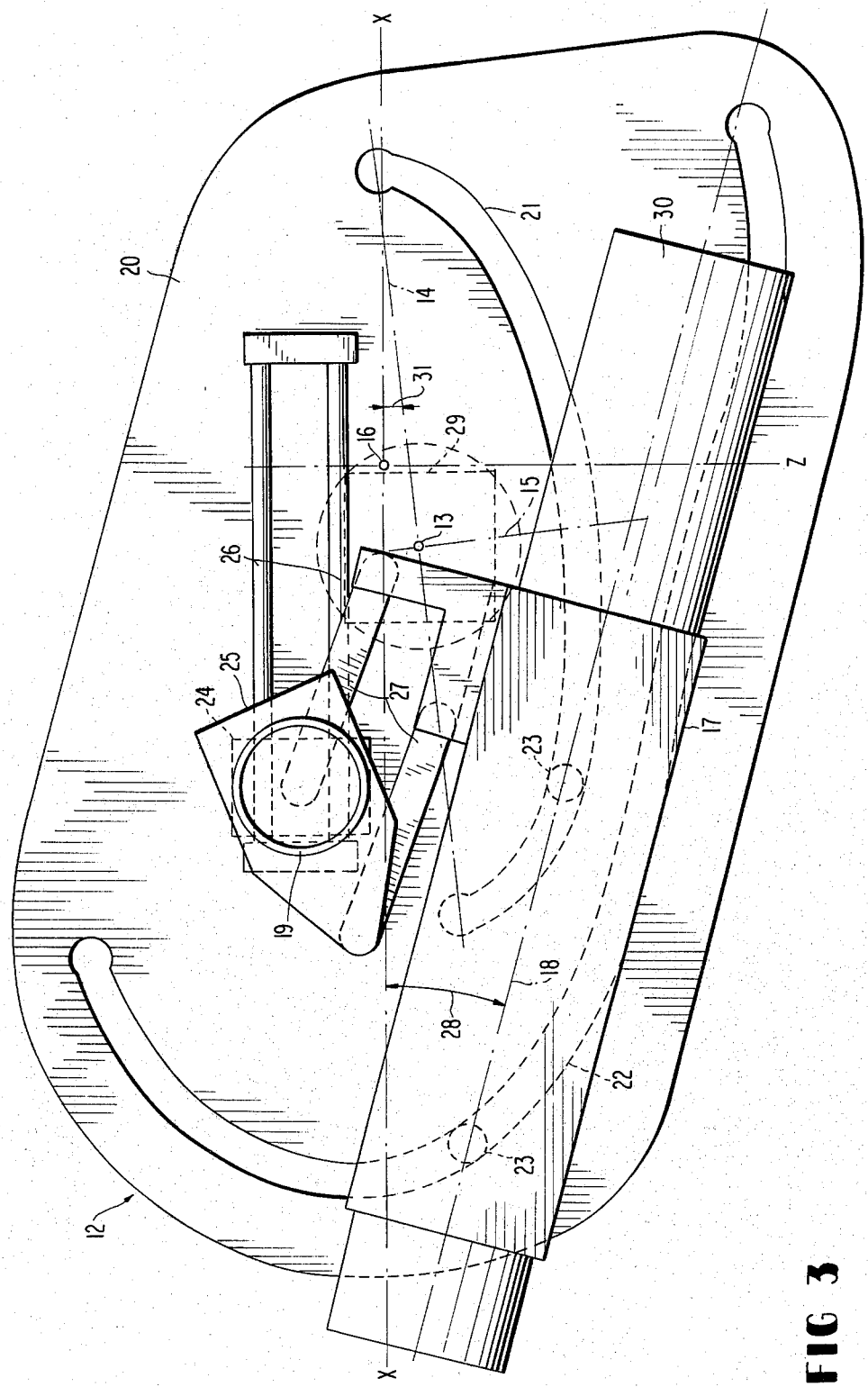
FIG. 3 is a side view of a viewing angle measuring device for an automotive vehicle in accordance with the present invention.

As shown in FIG. 3, a plan view visual ellipse is in correspondence with the eye arrangement recognizable in plan view in a paired configuration so as to appear as a double ellipse. The reference or coordinate system for the plan view ellipse 9 is formed by a Y-axis lying, in plan view, in the same position with respect to the hip point 7 and extending perpendicularly to a center line 10 of the vehicle 1, and an X-axis extending in parallel to the center line 10 of the vehicle and center line 11 of the steering wheel. The plan view ellipses 9 are inclined with respect to the X-axis with their major half axis by 5.4° forwardly and toward the center of the vehicle 1. Moreover, a center of the left visual ellipse is offset somewhat laterally in a forward direction toward the left with respect to a center of the plan view reference or coordinate system.

Tubular data regarding the exact size and position of the plan view visual ellipse 9 in dependence upon the adjustable range of a vehicle seat, a seat back inclination, lateral spacing of the steering wheel from the center of the vehicle and from the shoulder space in front may be found in the aforementioned SAE Publications which are incorporated herein by reference to the extent necessary in understanding the present invention.

To determine visibility of an object, sighting beams $S_1$, $S_2$ (FIG. 1) and $S_2$, $S_3$ (FIG. 2) are drawn from the object tangentially to the respective visual ellipse 4, 9. If the sighting beams do not impinge on a visual obstacle at the vehicle, and the visual ellipse 4 or 9 is the so-called 95% visual ellipse, then it can be said that the object is still visible to at least 95% of the population utilizing the vehicle 1. The viewing angles 28a, 28b are the angles of the drawn sighting beams $S_1$, $S_2$ or $S_3$, $S_4$ with respect to the X-axes. A viewing angle determined in this way must, in the case of measurements of a vertical viewing angle 28a, not be larger than about 45° in an upward direction and 65° in a downward direction and, in the case of measurements of a horizontal viewing angle 28b, must not be larger than ±30° because a head attitude oriented straight ahead was in all cases made the basis for the statistical calculations executed for determining the configuration of the visual ellipse.

Furthermore, it is assumed, which is extensively true when driving in a normal fashion, that the visual range is substantially covered merely by pivoting the eyeball without turning the head. As experience has shown, it is possible to cover, without turning one's head or inclining one's head, horizontally a viewing range of about ±30° and vertically a viewing range of 45° upwardly and 65° downwardly with respect to the normal straight ahead viewing direction. If a larger visual range is to be covered, the head will also have to be pivoted.

FIGS. 3 and 4 provide an example of a viewing angle measuring device of the present invention which may be utilized to determine the viewing angles in connection with an actually constructed vehicle based on the visual ellipse. More particularly, as shown in these figures, an elliptical template 12 is provided which is affixed with the vehicle 1 in a prescribed relative position by means of a template holder 29. A measuring beam projector 17, which may be tangentially guided along a governing contour of the elliptical template 12 is provided as well as a goniometer 19 arranged between the measuring beam projector 17 and the elliptical templates 12 so as to enable rendering of an analog measure to be indicated for the viewing angle 28 between the optical axis 18 of the measuring beam projector 17 and a reference direction determined at the measuring templates 12.

A guide groove 21 is provided or worked into the template 12 corresponding to the curve of one half of the side elevation of the visual ellipse. The position of the major half axis 14 and minor half axis 15 as well as the ellipse center 13 are illustrated in FIG. 3. The template holder 29 engages in the center 13 of the ellipse so that the half ellipse can be supplemented to a complete ellipse by turning 180°.

In addition to the guide groove representing the actual visual ellipse, a reference groove 22 is worked into the guide plate 20. In the illustrated embodiment, the curve of the reference groove 22 results from the course of the guide groove 21 in that from each point on the center line of the guide groove 21 tangentially equidistantly, a point is determined or set for the center line of the reference groove 22. Two sliding pins 23 engage into the grooves 21, 22 with the pins being arranged at the measuring beam projector 17. The pins 23 are in congruence with the optical axis 18 whereby, during a shifting of the measuring beam projector 17 along the grooves 21, 22, the measuring beam projector 17 is guided with its optical axis in all cases tangentially along the guide groove and/or the center line of the measuring beam projector 17. To be able to focus the measuring beam especially sharply, the measuring beam projector 17 is equipped with a laser device 30.

FIG. 3 also provides an illustration of the position of the X-axis and the Z-axis as well as the center 16 of the coordinate or reference system. The X-axis is inclined with respect to the major half axis by 6.4° downwardly and forwardly as indicated by the angle designated 31. Additionally, the center 13 of the ellipse is offset in each case by a specific value with respect to a center or 0.16 of the reference or coordinate system in the forward and downward direction. This relative positioning of the coordinate axes and half axes of the ellipse holds true for only a quite specific adjusting range of the driver's seat and a specific inclination of the seat back. In most instances, a seat back inclination of 25° may be used as the base inclination figure.

The viewing angle measuring device shown in FIGS. 3 and 4 is installed and/or fixedly mounted in the vehicle approximately centrally above the driver's seat in such a way that the center or 0.16 of the coordinate system, indicated on the base or guide plate 20 lies 635 mm vertically above the hip point 7 and the X-axis runs or extends horizontally.

In the installation position shown in FIG. 3, the guide groove 21 and reference groove 22 as well as the measuring beam projector 17 are arranged beneath the centers 13, and 16. Such an installation holds true primarily for viewing angle measurements in a downward direction because the lower contour of the visual ellipse represents the visual conditions of small or short drivers from whom the visual relationships in the downward direction are critical. With a viewing angle measurement in the upward direction for large or tall persons, the viewing angle measuring device must be attached to the holder 29 after a rotation of 180° about the X-axis wherein the relative position of the visual ellipse in the vehicle remains preserved but wherein the guide groove 21 extends above the centers 13, 16. In both installation positions it is possible to determine viewing angles below and above the X-axis; however, the upper ellipse contour, as noted above, is essentially representative for tall persons whereas the lower contour is essentially representative for short individuals.

As can be readily appreciated that at least for the plan view visual ellipse, it is necessary to keep available a further base plate 20 with further guide and reference grooves 20, 21 correspondingly provided therein due to the different configuration of the plan view visual ellipse as compared to the side elevation visual ellipse. The plan view visual ellipse has a longer minor half axis than the side elevational visual ellipse. The same also holds true for the determination of viewing angles with the use of 90% visual ellipses or 99% visual ellipses which are also occasionally utilized.

As noted above, a goniometer 19 is provided between the elliptical template 12 and base or guide plate 20, on the one hand, and the measuring beam projector 17 on the other hand. The goniometer includes two mutually pivotable members 24, 25 between which, in the illustrated embodiment, a rotary potentiometer is arranged as a rotation-sensitive angular measuring member. The relative pivoting of the two mutually pivotable members 24, 25 with respect to each other leads to a change in the resistance at the rotary potentiometer representing an analog signal for the pivoting angle. With a linear variation of the resistance at the rotary potentiometer, the instantaneous resistance of the latter yields a directly utilizable value which can be indicated on a galvanometer having an indicator scale calibrated in angular degrees so as to indicate the viewing angle 28.

The linear subdivision of the rotary potentiometer makes it possible to effect a zero point adjustment in any position. The first member of the goniometer 19 is guided to be displaceable in parallel on a guide post 26 connected to the base or guide plate 20. The guide post 26 is aligned in parallel to the X-axis and represents the direction of the latter. If, in certain cases of application, viewing angle measurements are conducted with the viewing angle measuring device illustrated in FIG. 3 wherein a different axial inclination angle 31 is the basis, then the zero point of the viewing angle indicator need merely be readjusted by the corresponding difference amount with respect to the normal setting. With the definite readjustment, new zero point position, it is then possible to read off the viewing angles corresponding to the changed relative axial inclination from the indicating instrument.

The other pivotal member 25 of the goniometer 19 is variable in its spacing by way of a parallelogram guide means 27. The member 25 is constantly associated with the measuring beam projector 17 in the rotary position. With a displacement and pivoting of the measuring beam projector 17 in the grooves 21, 22, the member 24 is shifted on the guide post 26 and the other member 25 follows the guide post 26; however, due to the parallelogram guide means 27 the member 25 is also pivoted in the same way as the measuring beam projector 17 with respect to the guide plates 20 and/or the guide post 26. The rotary potentiometer provided in the goniometer 19 yields another resistance value corresponding to the new pivoted position of the measuring beam projector 17, which value can be indicated as the viewing angle 28.

While we have shown and described only one embodiment in accordance with the present invention, it is understood that the same is not limited thereto but is susceptible of numerous changes and modifications as known to one having ordinary skill in the art and we therefore do not wish to be limited to the details shown and described herein, but intend to cover all such modifications as are encompassed by the scope of the appended claims.

We claim:

1. A viewing angle measuring device for automobile vehicles, the measuring device comprising an elliptical template means corresponding to a visual ellipse, the template means having a governing curve and being adapted to be arranged in the vehicle at a prescribed relative position with respect to a driver's seat of the vehicle so that a center of the visual ellipse is disposed at a specific position and the visual ellipse is disposed at a predetermined axial inclination, a measuring beam projector means arranged on the template means so as to be guided with at least one of an optical axis of the projector beam and a measuring beam tangentially along the governing curve, and goniometer means connected with the measuring beam projector means for determining a direction of a measuring beam with respect to a reference plane as a measure for the viewing angle.

2. A measuring device according to claim 1, characterized in that means are provided for continuously indicating the viewing angle.

3. A measuring device according to one of claims 1 or 2, wherein the elliptical template means includes a guide plate, a guide groove means corresponding to the visual ellipse and defining the governing curve is provided in the guide plate, a reference groove means is provided in the guide plate at one of tangentially and an acute angle equidistantly from the guide groove means, means are provided for slidingly connecting the measuring beam projector means to the guide plate, said connecting means being engageable in the guide groove means and the reference groove means, said connecting means being fixedly connected to the measuring beam projector means so as to be one of congruent with and laterally offset with respect to the optical axis of the measuring beam projector means such that the measuring beam projector means lies in all cases with the measuring beam being tangential to a center line of the guide groove means.

4. A measuring device according to claim 3, characterized in that the connecting means are formed as one of sliding blocks or sliding pins.

5. A measuring device according to claim 3, characterized in that the measuring beam projector means includes a laser means serving as a source of the measuring beam.

6. A measuring device according to claim 3, wherein the goniometer includes two mutually pivotable members, means are provided for guiding one of the two members so as to be movable in parallel to the guide plate, and wherein means are provided for guiding the other member of the goniometer at the measuring beam projector in parallel to the guide plate at a spacing with respect to the measuring beam projector means but always in constant relative rotary position with respect thereto.

7. A measuring device according to claim 4, characterized in that the means for guiding one of the members of the goniometer is a guide post arranged on the guide plate.

8. A measuring device according to claim 7, characterized in that the means for guiding the other member of the goniometer at the measuring beam projector means includes a parallelogram guide means.

9. A measuring device according to claim 8, characterized in that the goniometer includes a rotary potentiometer means disposed between the two mutually pivotable members for serving as a rotation-sensitive angular measuring member.

10. A measuring device according to one of claims 1 or 2 wherein the goniometer includes two mutually pivotable members, means are provided for guiding one of the two members so as to be movable in parallel to the guide plate, and wherein means are provided for guiding the other member of the goniometer at the measuring beam projector in parallel to the guide plate at a spacing with respect to the measuring beam projector means but always in constant relative rotary position with respect thereto.

11. A measuring device according to claim 10, characterized in that the means for guiding one of the members of the goniometer is a guide post arranged on the guide plate.

12. A measuring device according to claim 11, characterized in that the measuring beam projector means includes a laser means serving as a source of the measuring beam.

13. A measuring device according to one of claims 1 or 2, characterized in that the measuring beam projector means includes a laser means serving as a source of the measuring beam.

* * * * *